US009189352B1

(12) United States Patent
deGaribody, Jr. et al.

(10) Patent No.: US 9,189,352 B1
(45) Date of Patent: Nov. 17, 2015

(54) FLIGHT TEST ONBOARD PROCESSOR FOR AN AIRCRAFT

(75) Inventors: John Russell deGaribody, Jr., Florissant, MO (US); Anita Elaine Johnson, Florissant, MO (US); Stephen P. Stukel, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 1528 days.

(21) Appl. No.: 12/577,331

(22) Filed: Oct. 12, 2009

(51) Int. Cl.
*G06F 11/22* (2006.01)
*G06F 11/273* (2006.01)

(52) U.S. Cl.
CPC .......... *G06F 11/2294* (2013.01); *G06F 11/273* (2013.01)

(58) Field of Classification Search
USPC .......................................... 702/122, 142, 184
See application file for complete search history.

(56) References Cited

U.S. PATENT DOCUMENTS

| 5,210,704 | A * | 5/1993 | Husseiny ........................ 702/34 |
| 6,947,858 | B2 | 9/2005 | Goodman et al. |
| 7,054,785 | B2 | 5/2006 | Goodman |
| 2004/0028023 | A1 * | 2/2004 | Mandhyan et al. ........... 370/351 |
| 2006/0026193 | A1 * | 2/2006 | Hood ............................ 707/102 |

* cited by examiner

*Primary Examiner* — Mischita Henson
(74) *Attorney, Agent, or Firm* — Yee & Associates, P.C.

(57) ABSTRACT

A method and apparatus are present for processing information. Raw information is received from a sensor network and a number of systems in an aircraft during a test of the aircraft performed during operation of the aircraft. The raw information is placed in a memory and is processed using processes run by a processor unit that accesses the memory to form processed information while new raw information is being received in the memory. The raw information and the processed information are both present in the memory. The raw information and the processed information are stored in a storage system. A determination is made as to whether additional tests are needed for the aircraft using the processed information prior to a conclusion of the operation of the aircraft. At least one of the raw information and the processed information are sent to a remote location using a wireless communications link.

25 Claims, 9 Drawing Sheets

FLIGHT TEST ONBOARD PROCESSOR FOR AN AIRCRAFT

BACKGROUND INFORMATION

1. Field

The present disclosure relates generally to computer systems and, in particular, to computer systems on aircraft. Still more particularly, the present disclosure relates to a method and apparatus for performing tests using computer systems on aircraft.

2. Background

Tests are performed on aircraft for different purposes. For example, tests may be performed on an aircraft during development and assembly stages. Additionally, tests also are performed to certify an aircraft for use. In certifying aircraft, different agencies require an aircraft to meet various safety and performance requirements. For example, in the United States, agencies, such as the Federal Aviation Agency, may require extensive testing before certifying an aircraft for flight.

Certification processes may include a number of different stages. For example, a model of an aircraft is analyzed. The analysis may include performing simulations of loads on the model to identify the response performance of the aircraft. After these models meet requirements, tests may be performed on aircraft on the ground. These tests may include, for example, placing loads on components or parts of the aircraft. Test data is obtained from these tests and analyzed.

After ground tests have been performed, tests with the aircraft in flight are made, and data is obtained during the tests. This data is compared against the data from the ground-based tests. When the different tests have been passed, the aircraft may then be certified.

Currently, in performing tests, many sensors are built into or placed on and in the aircraft. For example, these sensors may be attached to or otherwise associated with the airframe of an aircraft. These different sensors, as well as information from systems in the aircraft, are obtained for analysis.

Currently, the analysis of the information is performed after the flight has occurred. Typically, this processing occurs after flight and/or overnight. This process of acquiring and processing information from tests performed on an aircraft requires time, which may lengthen and increase the expense for the certification process.

Therefore, it would be advantageous to have a method and apparatus that takes into account one or more of the issues discussed above, as well as possibly other issues.

SUMMARY

In one illustrative embodiment, an apparatus comprises a memory and a processor unit. The memory is configured to receive raw information from a sensor network and a number of systems in an aircraft and store program code for a number of processes. The raw information is received during operation of the aircraft. The processor unit is configured to run the program code for the number of processes stored in the memory to process the raw information to form processed information while new raw information is being received by the memory. The raw information and the processed information are both present in the memory. The processor unit is also configured to send the raw information to a storage system and send the processed information to the storage system. Further, the processor unit is configured to determine whether a number of additional tests are needed for the aircraft using the processed information prior to a conclusion of the operation of the aircraft.

In another illustrative embodiment, a test system for an aircraft comprises a random access memory, program code, a sensor network, a number of avionic systems, and a processor unit. The program code is for a number of processes stored in the random access memory. The processor unit is configured to run the program code for the number of processes to receive raw information and to place the raw information in the random access memory. The raw information is received from the sensor network and the number of avionics systems during a test performed during operation of the aircraft. The processor unit is configured to process the raw information to form processed information while new raw information is being received in the random access memory. The raw information and the processed information are both present in the random access memory. The processor unit is configured to send the raw information to a storage system and send the processed information to the storage system. The processor unit is also configured to determine whether a number of additional tests are needed using the processed information.

In yet another illustrative embodiment, a method is present for processing information. Raw information is received from a sensor network and a number of systems in an aircraft. The raw information is received during a test of the aircraft performed during the operation of the aircraft. The raw information is placed in a memory. The raw information is processed using a number of processes run by a processor unit that accesses the memory to form processed information while new raw information is being received in the memory. The raw information and the processed information are both present in the memory. The raw information is stored in a storage system. The processed information is stored in the storage system. A determination is made as to whether a number of additional tests are needed for the aircraft using the processed information prior to a conclusion of the operation of the aircraft. At least one of the raw information and the processed information is sent to a remote location using a wireless communications link.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

Figure 1:
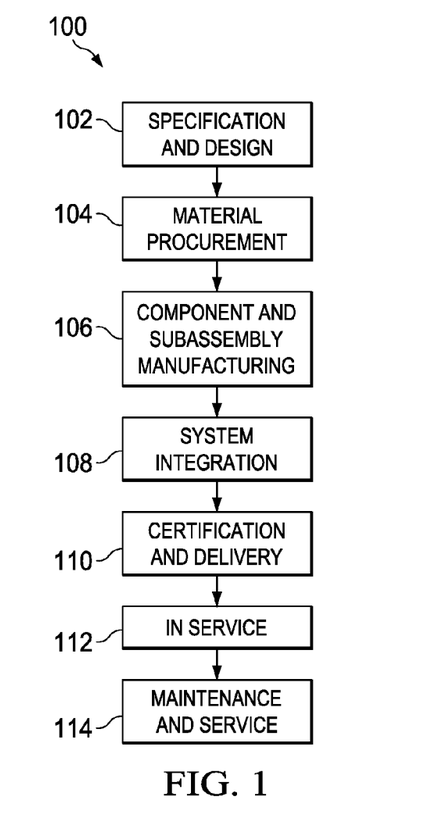
FIG. 1 is an illustration of an aircraft manufacturing and service method in accordance with an illustrative embodiment.
Figure 2:
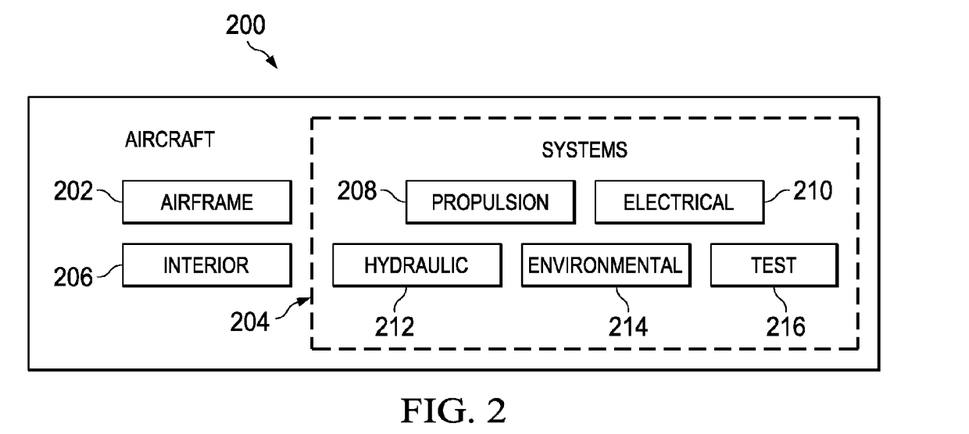
FIG. 2 is an illustration of an aircraft in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and test system 216. Any number of other systems may be included. Although an aerospace example is shown, different illustrative embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. As an example, different illustrative embodiments may be integrated or added to aircraft during one or more of the stages. A number, when referring to items, means one or more items. For example, a number of apparatus embodiments is one or more apparatus embodiments.

A number of apparatus embodiments, method embodiments, or a combination thereof may be utilized while aircraft 200 is in service 112 and/or during maintenance and service 114 in FIG. 1. One or more of the number of illustrative embodiments may be used during one or more of the different stages to collect information using test system 216.

The different illustrative embodiments recognize and take into account a number of different considerations. For example, the different illustrative embodiments recognize and take into account that currently used test systems have limited processing capabilities and architectures. With currently available systems, information is collected during tests or other operations of an aircraft. Processing of this information during the operation of the aircraft in flight is not currently feasible with the amount of information collected. These test systems store the information. The information is downloaded after the aircraft has returned to the ground. The information is then processed for review.

The different illustrative embodiments recognize and take into account that one factor that limits the processing of information is the amount of resources present in currently available test systems. The computers used in these test systems currently do not have the storage and processing power to process data as quickly as desired.

Additionally, the architecture or configuration of the hardware and software also reduces the processing speed. One approach may involve distributing processing of information. This approach often requires additional operating systems, which increases the cost.

Thus, the different illustrative embodiments provide a method and apparatus for processing information. In one illustrative embodiment, an apparatus comprises a memory and a processor unit. The memory is configured to receive raw information from a sensor network and a computer system for an aircraft. The processor unit is configured to process the raw information to form processed information, while new raw information is being received by the memory. The raw information and the processed information are both present in the memory. The raw information is sent to a storage system. The processed information also is sent to the storage system. When the processed information and the raw information are no longer needed by the processing unit, the processed information is removed from the memory.

Further, in the different illustrative embodiments, program code run by the processor unit is located in a single memory.

The memory may be, for example, a random access memory. Further, the raw and processed information also remain in the memory. This configuration reduces the amount of time to perform operations on information as compared to slower storage systems.

Figure 3:
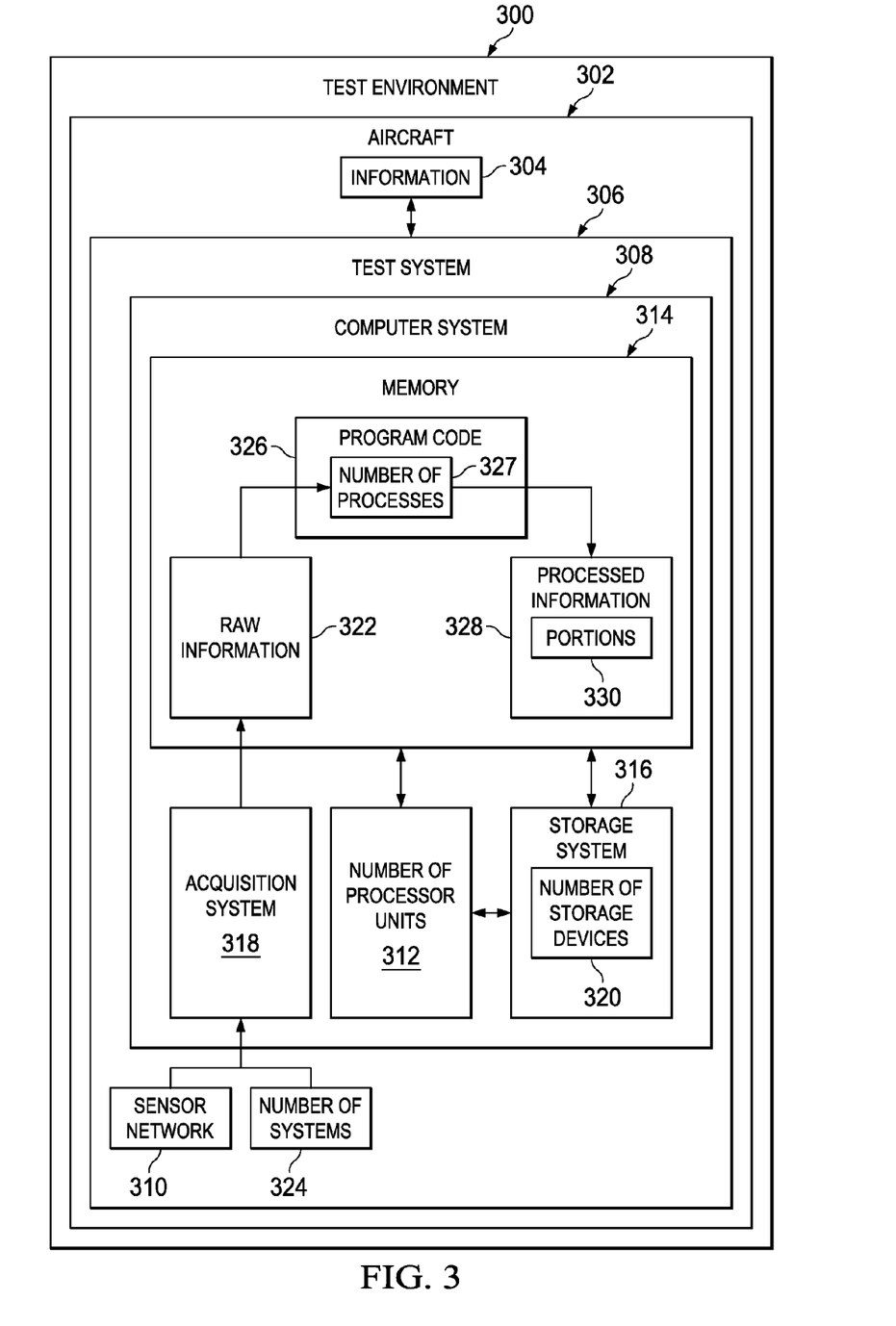
FIG. 3 is an illustration of a test environment in which an illustrative embodiment may be implemented.

With reference now to FIG. 3, an illustration of a test environment is depicted in accordance with an illustrative embodiment. Test environment 300 is an example of an environment that may be implemented for aircraft 302. Aircraft 302 may be, for example, without limitation, aircraft 200 in FIG. 2.

Test environment 300 collects information 304 during the operation of aircraft 302. This operation may be, for example, when aircraft 302 is in testing, in service, during maintenance, and/or during other suitable operations of aircraft 302.

In this illustrative example, test system 306 is an example of one implementation for test system 216 in FIG. 2. Test system 306 includes computer system 308 and sensor network 310. In this illustrative example, computer system 308 includes number of processor units 312, memory 314, storage system 316, and acquisition system 318. Computer system 308 may include more than one computer in which all of the computers within computer system 308 have access to memory 314 in these illustrative examples. With this type of configuration, memory 314 may be referred to as a shared memory.

A processor unit within number of processor units 312 may take various forms. For example, a processor unit may be a processor, a multi-core processor, a digital signal processor, a central processing unit, multiple processors, and/or some other suitable type of processor. When more than one processor is present in a processor unit, the processors may be of the same type or different types. Further, the types of processors present in number of processor units 312 when more than one processor unit is used may be of the same type of processor unit or different types of processor units. Each of number of processor units 312 shares memory 314.

Storage system 316 comprises number of storage devices 320. A storage device within number of storage devices 320 may be, for example, without limitation, a hard disk drive, a solid state drive, an optical disk drive, a tape drive, or some other suitable form of storage. Number of storage devices 320 may be located in a number of different locations within aircraft 302, depending on the particular implementation.

Acquisition system 318 is a hardware interface that obtains raw information 322. Raw information 322 is received from sensor network 310 and number of systems 324 in these depicted examples. Number of systems 324 may include, for example, systems within systems 204 in FIG. 2. In these illustrative examples, raw information 322 is received during operation of aircraft 302. Operation of aircraft 302 includes at least one of operation of aircraft 302 in the air and operation of aircraft 302 on ground in these depicted examples.

Operation of aircraft 302 in the air occurs during the flight of aircraft 302. The operation may include different phases of flight of aircraft 302. These phases may include, for example, take-off, landing, cruising, climbing, descending, and/or other phases during which aircraft 302 is in the air. More specifically, raw information 322 is received during a test of aircraft 302 performed during operation of aircraft 302. In these illustrative examples, a test is a number of operations performed on aircraft 302 to provide raw information 322 for aircraft 302. For example, a test may be at least one of a maneuver, a number of maneuvers, running a program, running a simulation, or some other suitable type of test.

Raw information 322 may include, for example, data, analog signals, digital signals, messages, commands, instructions, and/or other suitable types of information. Raw information 322 is processed by number of processor units 312 running program code 326. Program code 326 for number of processes 327 also is located in memory 314. The processing of raw information 322 forms processed information 328. Processed information 328 also is located in memory 314. In these different illustrative examples, program code 326, raw information 322, and processed information 328, and different components in memory 314 remain in memory 314 and are not paged out or moved into other slower storage devices, such as those in number of storage devices 320. A storage device in storage devices 320 may not be slower in providing access to information. This storage device, however, may slow down processing of raw information 322, because information in the storage device is moved into memory 314 before that information is used or processed by number of processor units 312.

In processing raw information 322, program code 326 also processes processed information 328. When portions of raw information 322 and/or processed information 328 are no longer needed for processing, portions 330 of processed information 328 are removed from memory 314 and stored in storage system 316 to make more space available within memory 314. Further, as raw information 322 is processed, raw information 322 also is stored in storage system 316.

In these illustrative examples, the configuration of computer system 308 is such that the processing of raw information 322 may be performed in real time. In these illustrative examples, real time means that information is processed as quickly as possible. The delays present in real time processing may include the time needed to send data from sensor network 310 and number of systems 324 into memory 314 for processing. Number of processes 327 processes raw information 322 as quickly as possible. In other words, with real time processing of a continual input, processing and output of data occurs. This type of processing is in contrast to collecting data over a period of time and then processing the data to generate results, as occurs with currently available systems.

With one or more of the different illustrative embodiments, raw information 322 may be processed and analyzed during operation of aircraft 302. As a result, collecting and processing information from tests may be performed more quickly as compared to the collecting and processing of information using currently available test systems.

The illustration of test environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in other illustrative embodiments, aircraft 302 may take other forms other than an aircraft. For example, without limitation, aircraft 302 may be an automobile, a truck, a submarine, a tank, a spacecraft, or some other suitable type of vehicle.

In still other illustrative embodiments, additional computer systems, in addition to computer system 308, may be present to process information 304. For example, computer system 308 and a number of other computer systems may each be assigned to process raw information 322 from different portions of sensor network 310 and different systems within number of systems 324.

As yet another example, test system 306 may refer to computer system 308 and not sensor network 310. Sensor network 310 may be considered to be a separate system from test system 306 in some illustrative embodiments.

Figure 4:
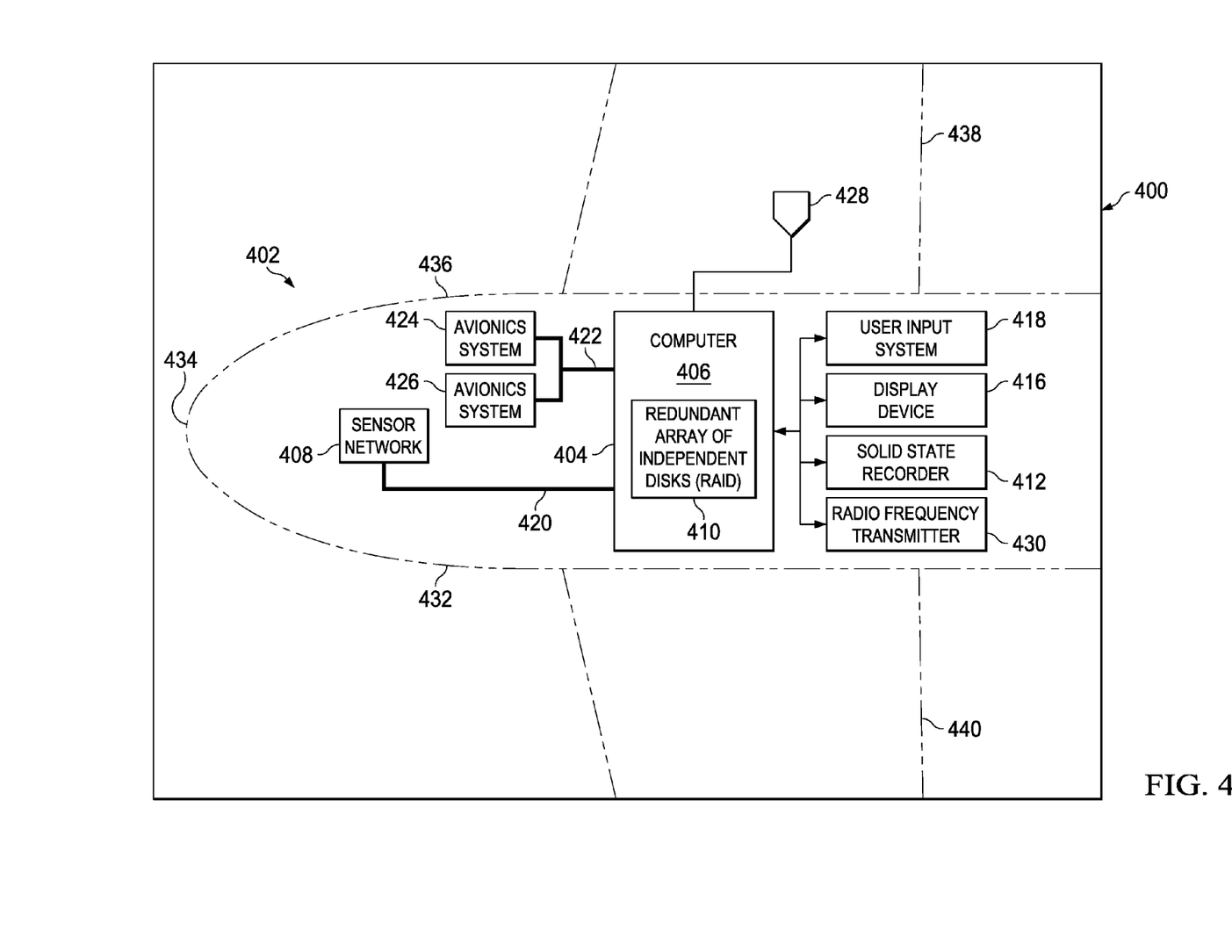
FIG. 4 is an illustration of a test environment in accordance with an illustrative embodiment.

With reference now to FIG. 4, an illustration of a test environment is depicted in accordance with an illustrative embodiment. In this illustrative example, test environment 400 is an example of one implementation for test environment 300 in FIG. 3.

Test environment 400 includes aircraft 402 and test system 404. Test environment 400 may be used to collect information during different operations of aircraft 402. For example, test environment 400 may be used to collect information during tests that are performed on aircraft 402. In other illustrative embodiments, test environment 400 may be used to collect information about aircraft 402 when aircraft 402 is in service or in maintenance.

In these examples, test system 404 is associated with aircraft 402. A first component may considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

In this example, test system 404 includes computer 406, sensor network 408, redundant array of independent disks (RAID) 410, solid state recorder 412, display device 416, and user input system 418. In these examples, computer 406 is an example of a computer that may be present in computer system 308 in FIG. 3. Computer 406 may be implemented within a computer that provides the processing resources needed for receiving and processing information during operation of aircraft 402. In these illustrative examples, computer 406 may be implemented using a super computer from Silicon Graphics Incorporated.

For example, an SGI ALTIX 4700 from Silicon Graphics Incorporated may be used. Redundant array of independent disks 410 and solid state recorder 412 are examples of storage devices within number of storage devices 320 in FIG. 3. Display device 416 and user input system 418 are components that may provide an interface to a human operator for computer 406. Solid state recorder 412 is a solid state disk system and does not include moving parts, as compared to redundant array of independent disks 410.

In this illustrative example, computer 406 is connected to sensor network 408 by bus system 420. Different components within sensor network 408 may be interconnected to each other by bus system 420. In these illustrative examples, bus system 420 may take the form of any bus that is capable of transmitting information from sensors within sensor network 408 to computer 406. In these illustrative examples, bus system 420 may be implemented using IntelliBus, which is available from Boeing Corporation.

Computer 406 also is connected to avionics system 424 and avionics system 426 by bus system 422. Avionics system 424 and avionics system 426 are systems in which a number of processor units are present. These avionics systems may be located in different locations within aircraft 402. Avionics system 424 and avionics system 426 may include a number of different types of components. For example, without limitation, these avionics systems may include flight control computers, environmental control devices, landing gear control systems, targeting systems, radar systems, navigation systems, propulsion control systems, and/or other suitable types of systems.

Bus system 422 may be implemented using a number of different types of buses. Bus system 422 also may include different types of buses, depending on the particular implementation. Bus system 422 may include at least one of Ethernet connections, fire wire connections, a data bus under ARINC 429, a Mil-Std-1553 bus, and/or other suitable types of connection systems.

In these illustrative examples, computer 406 also is connected to global positioning unit 428. Global positioning unit 428 may provide time information to computer 406. Further, computer 406 also is connected to radio frequency transmitter 430. Radio frequency transmitter 430 provides a capability to transmit information to a remote location from aircraft 402 during operation of aircraft 402.

In these illustrative examples, sensor network 408 may be distributed to obtain information about airframe 432 of aircraft 402. For example, sensor network 408 may obtain information about airframe 432 in locations, such as nose 434, fuselage 436, wing 438, and wing 440.

The illustration of aircraft 402 and test system 404 in FIG. 4 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in other illustrative embodiments, computer 406 may be connected to other systems other than or in addition to avionics system 424 and avionics system 426. For example, computer 406 may be connected to an environmental control system, a propulsion system, a navigation system, or any other suitable type of system in aircraft 402. In still other illustrative embodiments, display device 416 and user input system 418 may be omitted.

Figure 5:
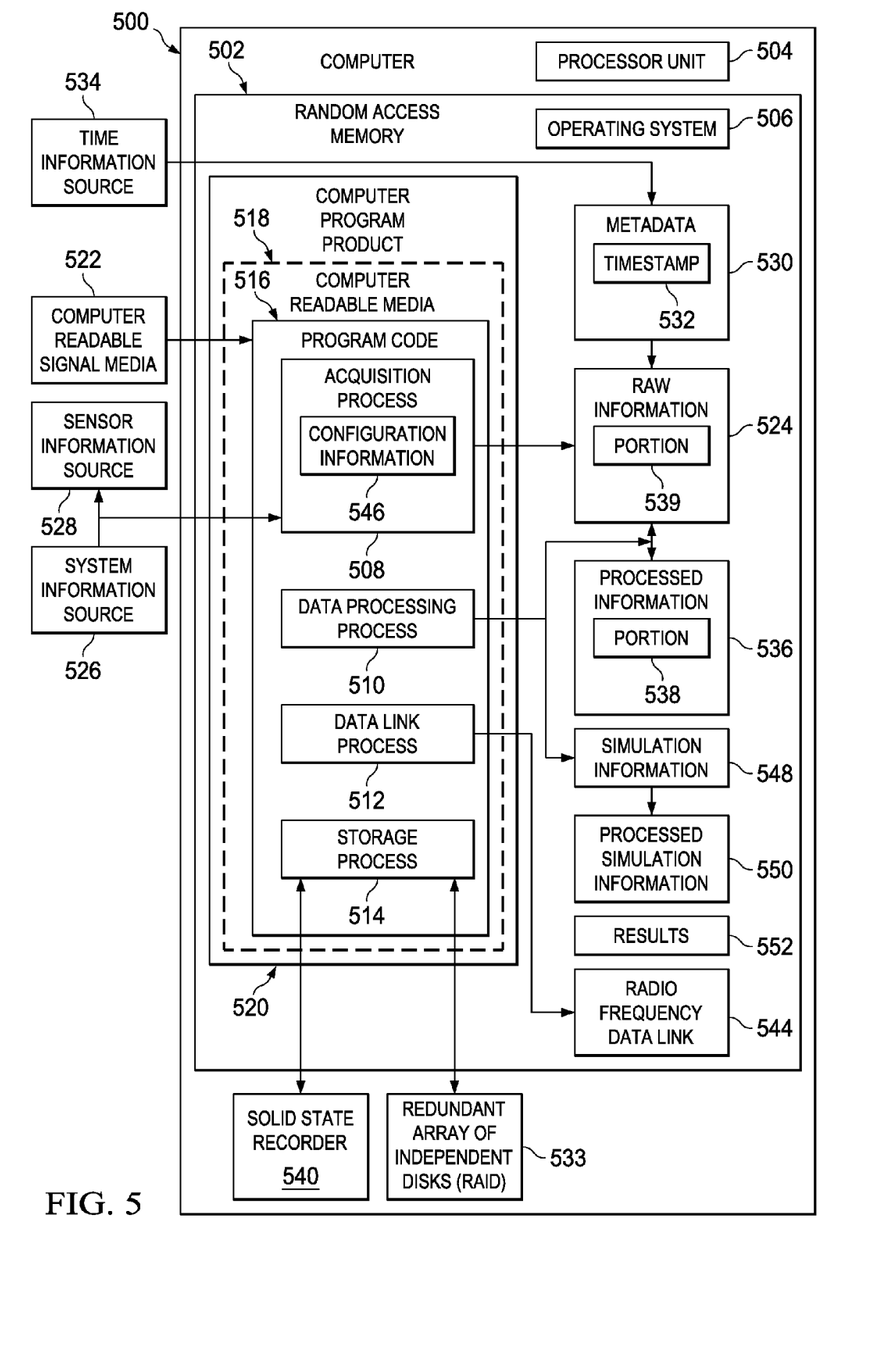
FIG. 5 is an illustration of a data flow for processing information in accordance with an illustrative embodiment.

Turning now to FIG. 5, an illustration of a data flow for processing information is depicted in accordance with an illustrative embodiment. In this illustrative example, computer 500 is an example of an implementation for a computer within computer system 308 in FIG. 3 and for computer 406 in FIG. 4. In this example, computer 500 includes random access memory 502 and processor unit 504. Random access memory 502 is an example of one implementation for memory 314 in FIG. 3. Processor unit 504 is an example of one implementation for number of processor units 312 in FIG. 3. In this illustrative example, only a single processor unit is illustrated, although additional processor units may be present, depending on the particular implementation.

As illustrated, operating system 506 executes within random access memory 502. Operating system 506, in these examples, is implemented using a Linux operating system. Of course, other types of operating systems may be used. Only one operating system is used in a number of the illustrative examples for the different software components. By using a single operating system, space and processing resources needed in computer 500 may be reduced.

In these examples, acquisition process 508, data processing process 510, data link process 512, and storage process 514 are examples of number of processes 327 in FIG. 3.

The instructions for these processes are located in random access memory 502 and executed by processor unit 504. These different processes may be implemented as program code 516 that is located in a functional form on computer readable media 518 that is selectively removable and may be loaded onto or transferred to computer 500 for execution by processor unit 504. Program code 516 and computer readable media 518 form computer program product 520 in these examples.

Computer readable media 518 may include, for example, an optical disk, a magnetic disk, or other suitable media that may be inserted or placed onto a drive or other storage device in computer 500. In other illustrative embodiments, computer readable media 518 may be a persistent storage, such as a hard drive, a thumb drive, a flash memory, a solid state disk drive, or some other suitable device that may be connected to computer 500. In some instances, computer readable media 518 may not be removable from computer 500.

Alternatively, program code 516 for at least one of acquisition process 508, data processing process 510, data link process 512, and storage process 514 may be transferred to computer 500 using computer readable signal media 522. Computer readable signal media 522 may be, for example, a propagated data signal containing program code 516. For example, computer readable signal media 522 may be an electromagnetic signal, a radio frequency signal, an optical signal, or any other type of signal. This signal may be transmitted over a communications link, such as a wireless communications link, an optical fiber cable, a coaxial cable, a wire, or any other suitable type of communications link. In other words, the communications link and/or connection may be physical or wireless in these examples.

In these illustrative examples, raw information 524 is received by acquisition process 508. Raw information 524 is received from system information source 526 and sensor information source 528 in these illustrative examples. In these illustrative examples, system information source 526 may be, for example, avionics system 424 and avionics system 426 in FIG. 4. Sensor information source 528 may be sensor network 408 in FIG. 4.

Acquisition process 508 receives raw information 524 in real time in these illustrative examples. Acquisition process 508 places raw information 524 into random access memory 502 for processing by data processing process 510. Further, acquisition process 508 may associate metadata 530 with raw information 524. Metadata 530 may include, for example, timestamp 532 from time information source 534. Time information source 534 may be, for example, global positioning system unit 428 in FIG. 4. Metadata 530 may include other types of information about raw information 524, depending on the particular implementation. For example, metadata 530 also may include the identification of the source of raw information 524, a location of the source of raw information 524, and/or other suitable types of information.

Data processing process 510 processes raw information 524 to form processed information 536. Data processing process 510 may use metadata 530 in processing raw information 524. Further, in processing raw information 524, portion 538 of processed information 536 may be used to process raw information 524. The processing of raw information 524 may include, for example, the conversion of units, arithmetic operations, and/or other suitable type of processing.

In these illustrative examples, storage process 514 stores raw information 524 in solid state recorder 540. Raw information 524 is stored in solid state recorder 540 such that raw information 524 may be examined or processed again at a later time. In some illustrative examples, raw information 524 may be removed from random access memory 502 once raw information 524 is stored in solid state recorder 540. In other illustrative examples, raw information 524 may remain in random access memory 502 after raw information 524 is stored in solid state recorder 540.

Additionally, when portion 538 of processed information 536 is no longer needed, portion 538 of processed information 536 is stored in redundant array of independent disks 533. In a similar fashion, when portion 539 of raw information 524 is no longer needed for processing by data processing process 510, portion 539 is removed from random access memory 502. In this manner, memory may be freed up for additional data.

In some illustrative embodiments, during the processing of information, a need may be present to free memory for additional data when processing of the information has not been completed. In these examples, portion 538 of processed information 536 and/or portion 539 of raw information 524 may be removed from random access memory 502 to free memory based on this need. Portion 538 may be stored in solid state recorder 540 in which portion 538 may be accessed for processing. In a similar fashion, portion 539 may be stored in redundant array of independent disks 533 in which portion 539 may be accessed for processing. In these examples, portion 538 and portion 539 may be processed by, for example, data processing process 510 at slower rates as compared to the processing of information within random access memory 502.

In addition, raw information 524 and/or processed information 536 may be sent to an external location using radio frequency data link 544 in these examples. In these examples, raw information 524 and/or processed information 536 are sent over radio frequency data link 544 by data link process 512. This transmission of information is a copy of information in random access memory 502 and does not remove raw information 524 or processed information 536 from random access memory 502 in these examples.

In these examples, acquisition process 508 may change the manner in which sensor information source 528 collects information using configuration information 546. Configuration information 546 may make changes to sensor information source 528 for different tests or analyses.

Additionally, simulation information 548 may be placed into random access memory 502 for processing by data processing process 510. Simulation information 548 may be information generated from simulations of a vehicle, such as aircraft 402 in FIG. 4. In some illustrative embodiments, simulation information 548 may simulate a test of the aircraft. Data processing process 510 may process simulation information 548 to generate processed simulation information 550. Processed simulation information 550 may then be compared to processed information 536 by data processing process 510. This comparison may generate results 552. Results 552 may be used to determine whether models used to simulate aircraft 402 are accurate or may need changes. Further, results 552 may be used to validate designs for models for different systems within aircraft 402.

The illustration of computer 500 and the software in computer 500 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, storage process 514 may be integrated as part of data processing process 510. In yet another example, configuration information 546 may be originated by data processing process 510 and sent through acquisition process 508 to sensor information source 528. As another example, in some illustrative embodiments, storage process 514 may send raw information 524 and processed information 536 to a remote location using radio frequency data link 544 instead of having data link process 512 perform this operation.

Figure 6:
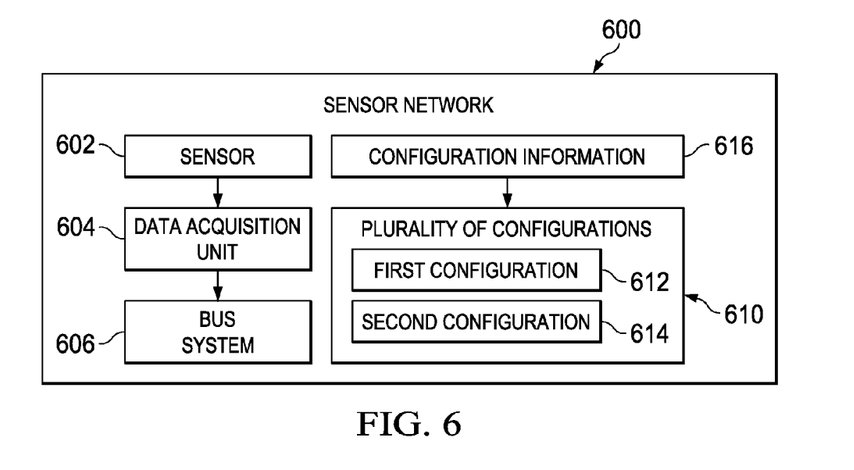
FIG. 6 is an illustration of a sensor network in accordance with an illustrative embodiment.

Turning now to FIG. 6, an illustration of a sensor network is depicted in accordance with an illustrative embodiment. In this example, sensor network 600 is an example of one implementation for sensor network 310 in FIG. 3 and sensor network 408 in FIG. 4. Sensor network 600 also is an example of sensor information source 528 in FIG. 5.

As illustrated, sensor network 600 includes sensor 602, data acquisition unit 604, and bus system 606. Sensor 602 is connected to data acquisition unit 604. In turn, data acquisition unit 604 is connected to bus system 606. Additionally, bus unit 606 also may be connected to a device, such as computer system 308 in FIG. 3, computer 406 in FIG. 4, or computer 500 in FIG. 5.

In these illustrative examples, sensor network 600 may have plurality of configurations 610. For example, sensor network 600 may initially be in first configuration 612 and then change into second configuration 614 in response to receiving configuration information 616. Configuration information 616 may include, for example, a number of commands, data, and/or other suitable information. Configuration information 616 may identify changes to data acquisition unit 604. Configuration information 616 may also change the operation of data acquisition unit 604. This change in operation may include, for example, without limitation, changing sampling rates, filtering, sensors used, and other suitable changes.

These changes may occur when an aircraft is flying a test program in which different maneuvers or states are reached. Different maneuvers may be used for different tests for the aircraft. The change in configuration in sensor network 600 may be performed dynamically without having to land the aircraft. As a result, different tests may be run without having to land the aircraft and change the configuration of data acquisition unit 604 or sensor 602 for the different tests.

Figure 7:
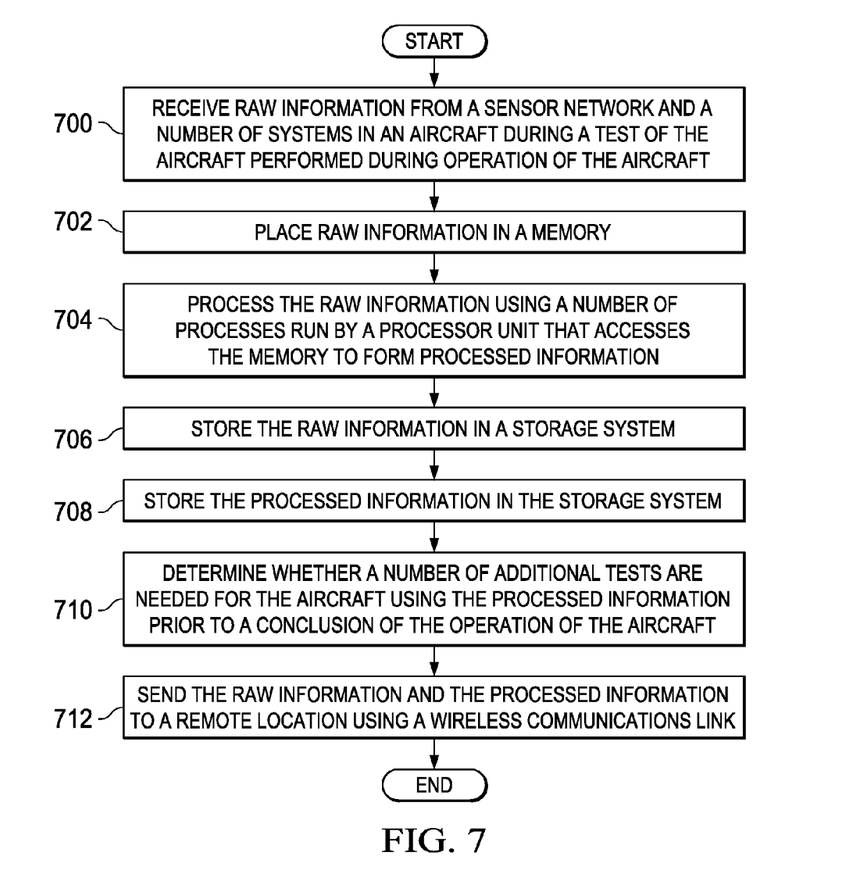
FIG. 7 is an illustration of a flowchart of a process for collecting information in accordance with an illustrative embodiment.

Turning now to FIG. 7, an illustration of a flowchart of a process for collecting information is depicted in accordance with an illustrative embodiment. The process illustrated in FIG. 7 is an example of a process that may be implemented in test environment 300 in FIG. 3. More specifically, this process may be implemented within number of processes 327 in FIG. 3.

The process begins by receiving raw information from a sensor network and a number of systems in an aircraft during a test of the aircraft performed during operation of the aircraft (operation 700). The process places the raw information in a memory (operation 702). In this illustrative example, raw information may include, for example, a digital value, an analog value, a command, a message, a digital image, flight data, a frame for a video, or some other suitable form of information. The memory may be, for example, a random access memory.

Thereafter, the process processes the raw information using a number of processes run by a processor unit that accesses the memory to form processed information (operation 704). In some examples, a number of processor units may be used to process the raw information. In other examples, a portion of the processed information may be used to process the raw information to form the processed information. In this illustrative example, operation 702 may be performed while new raw information is being received in the memory. Further, the raw information and the processed information are both present in the memory.

The process then stores the raw information in a storage system (operation 706). The process stores the processed information in the storage system (operation 708). The storage system may be comprised of a number of storage devices. Thereafter, the process determines whether a number of additional tests are needed for the aircraft using the processed information prior to a conclusion of the operation of the aircraft (operation 710).

The process then sends the raw information and the processed information to a remote location using a wireless communications link (operation 712), with the process terminating thereafter.

Figure 8:
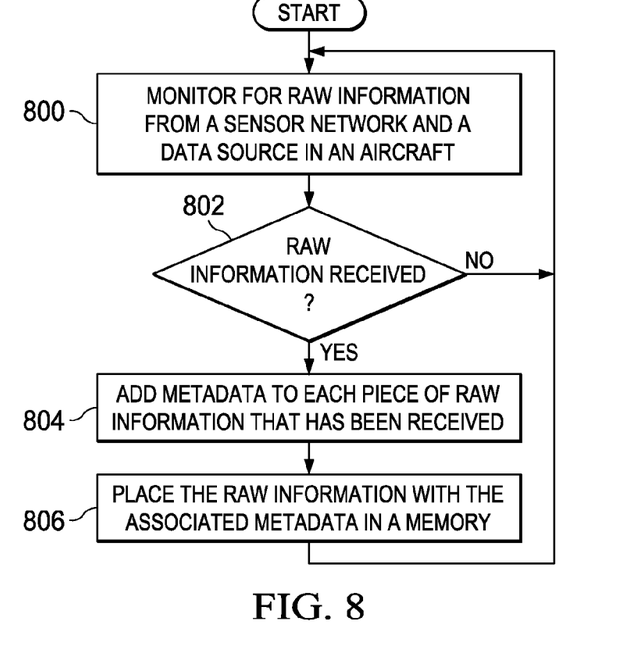
FIG. 8 is an illustration of a flowchart of a process for receiving information in accordance with an illustrative embodiment.

In FIG. 8, an illustration of a flowchart of a process for receiving information is depicted in accordance with an illustrative embodiment. The process in FIG. 8 is an example of operations that may be performed by acquisition process 508 in FIG. 5.

The process begins by monitoring for raw information from a sensor network and a data source in an aircraft (operation 800). A determination is made as to whether raw information has been received (operation 802). If raw information has been received, the process adds metadata to each piece of raw information that has been received (operation 804). In these illustrative examples, a piece of raw information may be, for example, a digital value, an analog value, a command, a message, a digital image, flight data, a frame for a video, and/or some other suitable form of information. The metadata associated with a piece of information describes that piece of information. In these examples, the metadata is a time stamp. Other metadata also may be associated with a piece of information in addition to or in place of a time stamp. For example, other metadata may include an identification of the device generating the piece of information, the location where the piece of information was generated, and/or other suitable metadata.

The process then places the raw information with the associated metadata in a memory (operation 806). The process then returns to operation 800. With reference again to operation 802, if raw information has not been received, the process also returns to operation 800.

Figure 9:
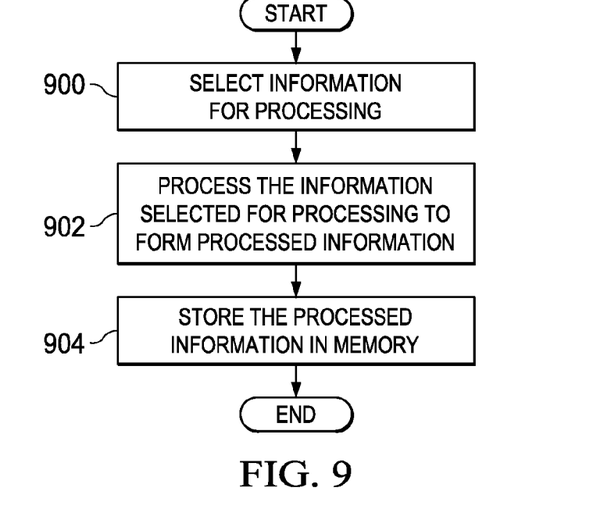
FIG. 9 is an illustration of a flowchart of a process for processing information in accordance with an illustrative embodiment.

Turning now to FIG. 9, an illustration of a flowchart of a process for processing information is depicted in accordance with an illustrative embodiment. The process illustrated in FIG. 9 is an example of a process that may be implemented in data processing process 510 in FIG. 5.

The process begins by selecting information for processing (operation 900). The selection of information in operation 900 may be, for example, a selection of raw information, such as a single piece of raw information or some number of pieces of raw information. The amount of raw information selected and the particular pieces of raw information selected may depend on the processing that is selected. Additionally, information needed for processing also may include processed information in addition to the raw information.

The information selected for processing is processed to form processed information (operation 902). In operation 902, the processing of the information may include, for example, without limitation, the conversion of units, arithmetic operations, and/or other suitable types of processing. The processed information is then stored in memory (operation 904), with the process terminating thereafter.

Figure 10:
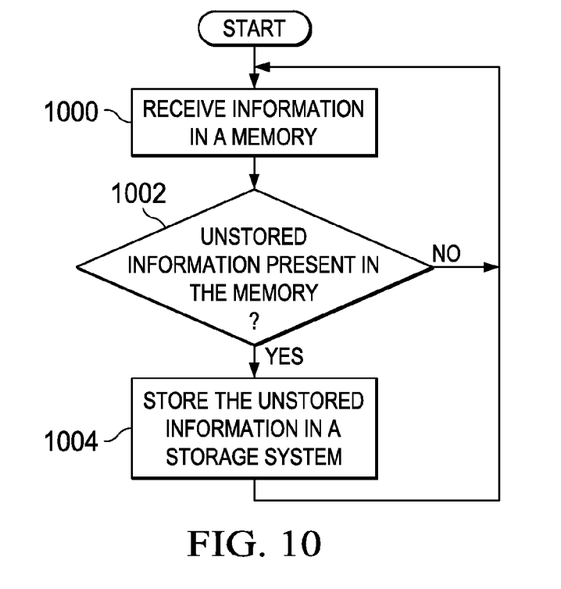
FIG. 10 is an illustration of a flowchart of a process for storing information in accordance with an illustrative embodiment.

With reference next to FIG. 10, an illustration of a flowchart of a process for storing information is depicted in accordance with an illustrative embodiment. The process illustrated in FIG. 10 is an example of a process that may be implemented in storage process 514 in FIG. 5.

The process begins by receiving information in a memory (operation 1000). The memory may take the form of random access memory 502 in FIG. 5. The process then determines whether any unstored information is present in the memory (operation 1002). If unstored information is not present in the memory, the process returns to operation 1000.

If unstored information is present in the memory, the process stores the unstored information in a storage system (operation 1004), with the process then returning to operation 1000. The particular storage device used to store the unstored information may be selected based on the type of information present in the memory. For example, if the unstored information is raw information, the raw information may be stored in a solid state recorder. If the unstored information is processed information, the processed information may be stored in a redundant array of independent disks. In operation 1004, the storing of the unstored information does not remove the raw information from the memory.

Figure 11:
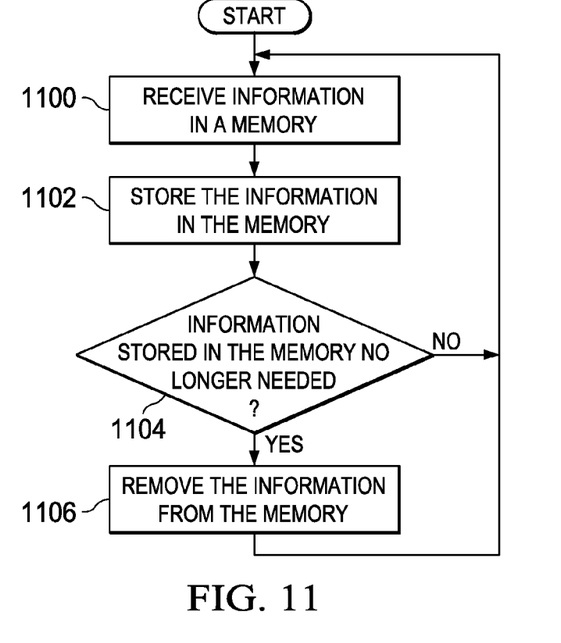
FIG. 11 is an illustration of a flowchart of a process for managing memory in accordance with an illustrative embodiment.

With reference next to FIG. 11, an illustration of a flowchart of a process for managing memory is depicted in accordance with an illustrative embodiment. The process illustrated in FIG. 11 may be implemented in storage process 514 in FIG. 5. Of course, this process may be implemented in other components, such as data processing process 510 in FIG. 5.

The process begins by receiving information in a memory (operation 1100). The memory may be implemented using random access memory 502 in FIG. 5. The information received in operation 1100 may be either raw information or processed information. This information also may include the metadata associated with the raw information or the processed information. The process then stores the information in the memory (operation 1102). Thereafter, the process determines whether information stored in the memory is no longer needed (operation 1104). If the information is still needed, the process returns to operation 1100.

If the information is no longer needed, the process removes the information from the memory (operation 1106), with the process returning to operation 1100. The information may be removed in a number of different ways. For example, the information may be deleted from the memory, the information may be overwritten with an initialization value, or some other suitable operation may be performed that frees the memory in which the information is located for use.

Figure 12:
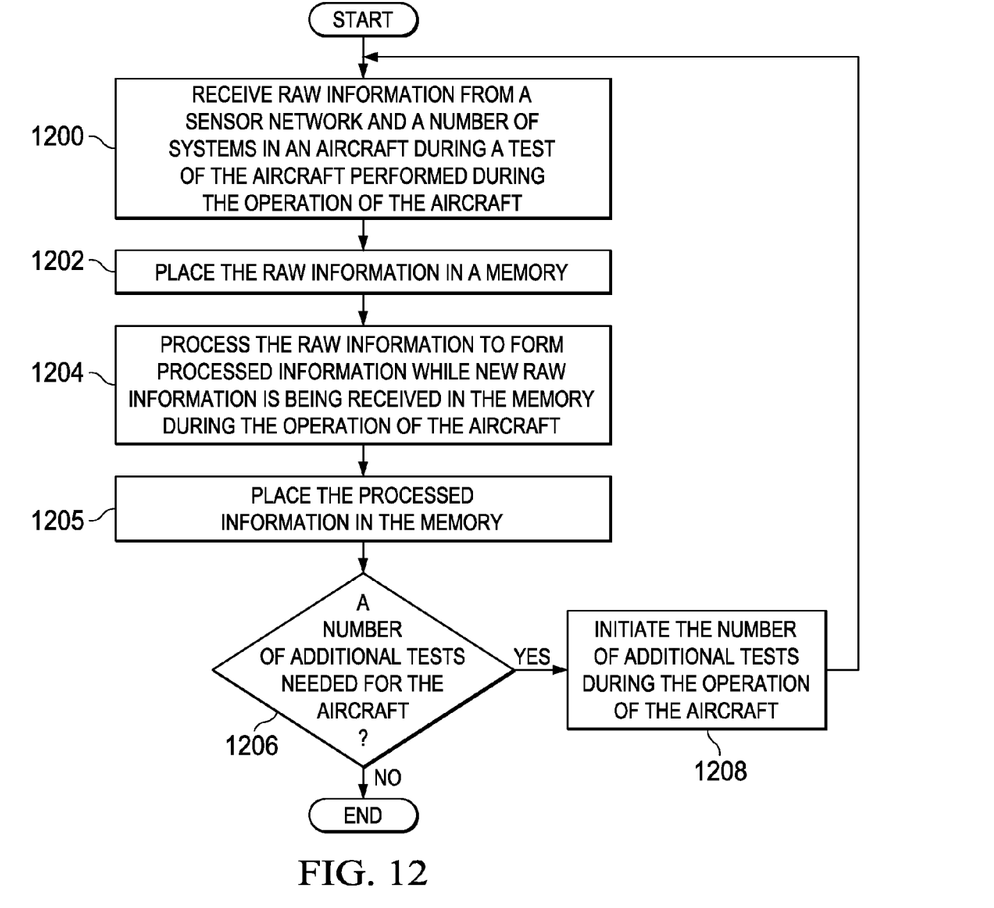
FIG. 12 is an illustration of a flowchart of a process for running tests on an aircraft in accordance with an illustrative embodiment.

With reference now to FIG. 12, an illustration of a flowchart of a process for running tests on an aircraft is depicted in accordance with an illustrative embodiment. The process illustrated in FIG. 12 is an example of a process that may be implemented in test environment 300 in FIG. 3. More specifically, this process may be implemented within number of processes 327 in FIG. 3.

The process begins by receiving raw information from a sensor network and a number of systems in an aircraft during a test of the aircraft during operation of the aircraft (operation 1200). The test may be any of a number of tests run by test system 306 for aircraft 302 in FIG. 3. In these illustrative examples, a test is a number of operations that are performed to provide raw information for the aircraft. For example, without limitation, a test may be a maneuver, a number of maneuvers, running a program, running a simulation, or some other suitable type of test.

One specific example of a test is a flutter test. A flutter test involves performing a number of flutter maneuvers at selected test points. In these examples, a test point is a set of conditions, such as a selected altitude and a selected airspeed.

Another example of a test is a load test in which a number of load maneuvers are performed at a number of test points. With this type of test, the test point is a selected altitude, a selected airspeed, and a load factor.

The process places the raw information in a memory (operation 1202). This memory may be, for example, memory 314 in FIG. 3. Thereafter, the raw information is processed to form processed information while new raw information is being received in the memory during the operation of the aircraft (operation 1204). The process places the processed information in the memory (operation 1205).

The process then determines whether a number of additional tests are needed for the aircraft (operation 1206). In these illustrative examples, the determination in operation 1206 may be made based on the processed information. For example, an operator may use the processed information to determine whether the number of additional tests is needed.

As a more specific example, the operator may determine whether the processed information falls within a threshold such that the number of additional tests is needed for the aircraft. In another example, a program may be run to determine whether the processed information indicates that the number of additional tests is needed. In some illustrative embodiments, the number of additional tests may involve performing the test in operation 1200 a second time.

In one illustrative example, when the test in operation 1200 is a flutter test, raw information may be received for a set of flutter maneuvers at set of test points. The processed information may be used to determine whether flutter maneuvers at additional test points are needed for the flutter test. The processed information may also be used to determine whether flutter maneuvers at selected test points may be removed from the set of test points such that the set of flutter maneuvers is reduced.

If no additional tests are needed for the aircraft in operation 1206, the process terminates. Otherwise, the process initiates the number of additional tests during the operation of the aircraft (operation 1208). Thereafter, the process returns to operation 1200, as described above. New raw information is received during a new test in the number of additional tests of the aircraft, while the aircraft is still in operation.

In these illustrative examples, the number of additional tests may be initiated by sending an indication to an operator of the aircraft, initiating a number of programs to run the number of additional tests, or performing some other suitable operation.

Figure 13:
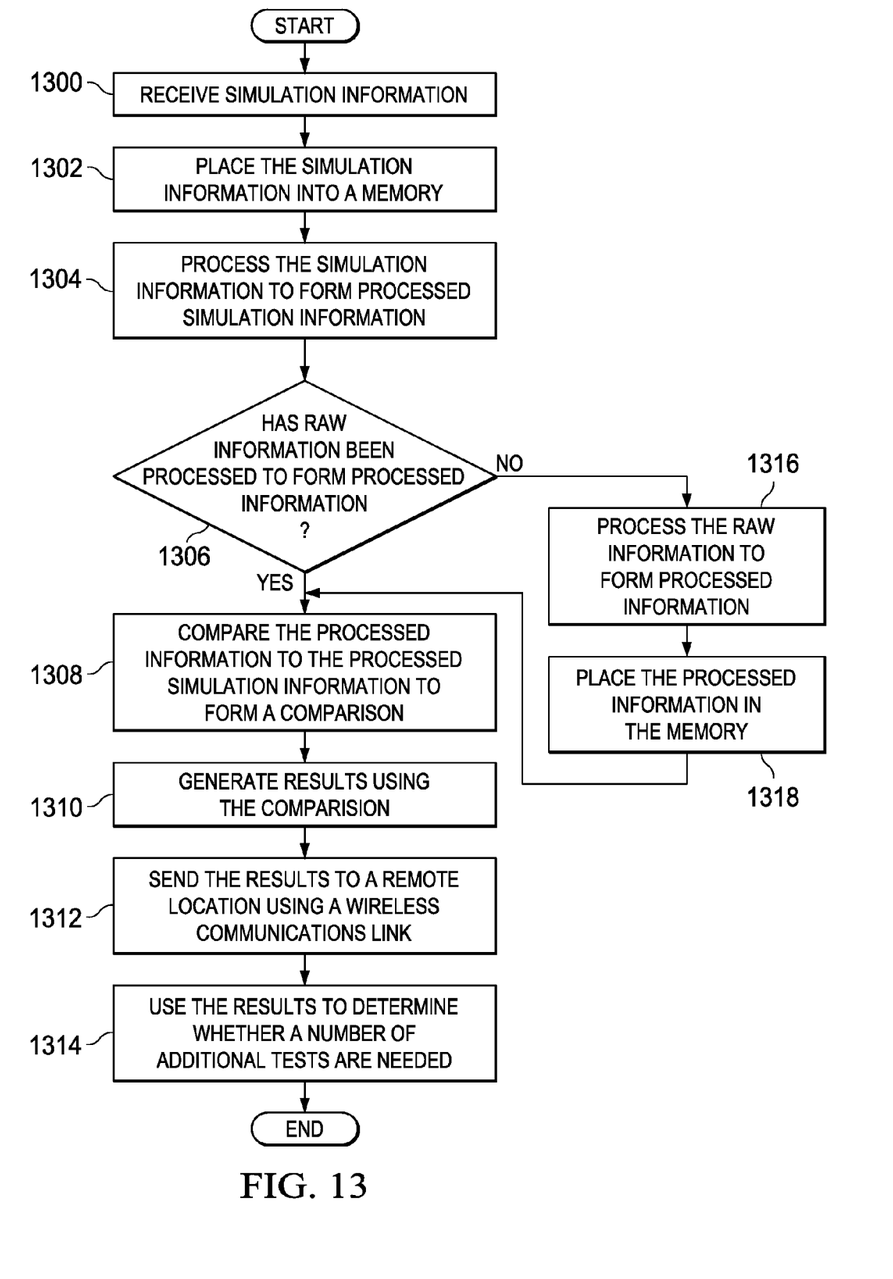
FIG. 13 is an illustration of a flowchart of a process for comparing test information to simulation information in accordance with an illustrative embodiment.

With reference now to FIG. 13, an illustration of a flowchart of a process for comparing test information to simulation information is depicted in accordance with an illustrative embodiment. The process illustrated in FIG. 13 may an example of a process in number of processes 327 in test environment 300 in FIG. 3. Further, the process may be implemented using program code 516 run on computer 500 in FIG. 5.

The process begins by receiving simulation information (operation 1300). The process places the simulation information into a memory (operation 1302). This memory may be, for example, random access memory 502 in FIG. 5. The simulation information is processed to form processed simulation information (operation 1304). For example, the simulation information may be processed by data processing process 510 in FIG. 5.

The process then determines whether raw information has been processed to form processed information (operation 1306). The raw information may be information that is generated during a test of an aircraft performed during the operation of the aircraft. If raw information has been processed to form processed information, the process compares the processed information to the processed simulation information to form a comparison (operation 1308). The process then generates results using the comparison (operation 1310). Thereafter, the process sends the results to a remote location using a wireless communications link (operation 1312). The results may be sent during the operation of the aircraft.

The process then uses the results to determine whether a number of additional tests are needed (operation 1314). This determination may be made by an operator at the remote location prior to the conclusion of the operation of the aircraft. Further, the determination made in operation 1314 may be an example of the determination made in operation 1206 in FIG. 12. In other words, the results may be used to determine whether a number of additional tests are needed for the aircraft during the operation of the aircraft.

With reference again to operation 1306, if raw information has not been processed to form processed information, the raw information is processed to form processed information (operation 1316). The process then places the processed information in the memory (operation 1318), with the process then continuing to operation 1308 as described above.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, although operations 704 and 706 in FIG. 7 are depicted with operation 704 being before operation 706, operation 706 may be performed before operation 704. In still other illustrative embodiments, operations 704 and 706 may be performed at substantially the same time. As another example, in some illustrative embodiments, operation 712 in FIG. 7 may be omitted.

Thus, the different illustrative embodiments provide a capability to reduce the amount of time needed to collect and process test data for aircraft. The information collected from testing an aircraft is processed in real time or close to real time during the operation of aircraft. As a result, downloading information after the flight and processing it overnight or the next day may be avoided. In this manner, the amount of time needed to process and analyze information from tests is reduced. Further, the different illustrative embodiments also provide a capability to process information more quickly without increasing the cost and complexity of the test systems.

With one or more of the different illustrative embodiments, information may be processed in a manner that allows for the processed information to be reviewed or analyzed during flight or after an aircraft has landed. This availability of the processed information allows for playback of processed data, running of simulation programs and comparisons to actual flight data, processing images or videos of operations in the aircraft, and/or other types of uses during or after flight. Further, in some illustrative embodiments, the sensor network is reconfigured to obtain information for different tests during flight. With this reconfiguration, more than one test can be run during the same flight of an aircraft.

Still further, with one or more of the different illustrative embodiments, information may be received during a test of an aircraft while the aircraft is in flight. The test may not take the entire duration of the flight. The information may be processed and analyzed to determine whether additional tests are needed for the aircraft during the flight. The different illustrative embodiments allow additional tests to be initiated during the flight of the aircraft as needed based on the processed information. In this manner, the time and expense associated with running one test per flight of an aircraft may be reduced or avoided. For example, the time and expense of landing, refueling, and/or preparing the aircraft for another flight may be reduced or avoided.

The different illustrative embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different illustrative embodiments has been presented for purposes of illustration and description, and it is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a sensor network disposed in an aircraft;
   a memory configured to receive raw information from the sensor network and a number of systems in the aircraft and store program code for a number of processes, wherein the raw information is received during operation of the aircraft;
   an acquisition process in the number of processes, the acquisition process configured to change a first configuration of the sensor network to a second configuration of the sensor network in response to receiving configuration information; and
   a processor unit configured to run the program code for the number of processes stored in the memory to process the raw information to form processed information in real time while new raw information is being received by the memory in which the raw information and the processed information are both present in the memory, send the raw information to a storage system, send the processed information to the storage system, and determine whether a number of additional tests are needed for the aircraft using the processed information prior to a conclusion of the operation of the aircraft.

2. The apparatus of claim 1, wherein the processor unit is configured to initiate the number of additional tests during the operation of the aircraft.

3. The apparatus of claim 1, wherein the processor unit is configured to receive simulation information, place the simulation information in the memory, process the simulation information placed into the memory to form processed simulation information.

4. The apparatus of claim 3, wherein the processor unit is further configured to compare the processed information to the processed simulation information.

5. The apparatus of claim 3, wherein the simulation information simulates a test.

6. The apparatus of claim 1, wherein the acquisition process is configured to receive the raw information from the sensor network and a number of avionics systems and place the raw information received from the sensor network and the number of avionics systems in the memory.

7. The apparatus of claim 6, wherein the acquisition process is configured to add metadata to the raw information.

8. The apparatus of claim 1, wherein the processor unit is configured to send at least one of the processed information and the raw information to a remote computer system in a location external to the aircraft using a wireless communications link.

9. The apparatus of claim 1, wherein the number of processes comprises at least one of an operating system, an acquisition process, a data processing process, a data link process, and a storage process.

10. The apparatus of claim 1, wherein the storage system comprises a first persistent storage device and a second persistent storage device.

11. The apparatus of claim 1, wherein the processor unit is configured to process simulation information to form processed simulation information and compare the processed simulation information with the processed information to form a comparison.

12. The apparatus of claim 11, wherein the processor unit is configured to process the simulation information to form the processed simulation information while processing the raw information to form the processed information and compare the processed simulation information with the processed information to form the comparison.

13. The apparatus of claim 11, wherein the sensor network comprises:
   a plurality of sensors associated with the aircraft; and
   a number of data acquisition units in communication with the plurality of sensors, wherein the number of data acquisition units receives signals generated by the plurality of sensors and converts the signals into the raw information.

14. The apparatus of claim 13, wherein the sensor network has a plurality of configurations and the sensor network is configured to change from a first configuration in the plurality of configurations to a second configuration in the plurality of configurations to perform a different test.

15. The apparatus of claim 11, wherein the sensor network is configured to change from the first configuration to the second configuration in response to receiving the configuration information at the acquisition process during operation of the aircraft.

16. The apparatus of claim 1, wherein the operation of the aircraft is selected from at least one of the operation of the aircraft in flight and the operation of the aircraft on ground.

17. A test system for an aircraft, the test system comprising:
   a random access memory comprising program code for a number of processes stored in the random access memory;
   a sensor network comprising a plurality of sensors associated with the aircraft;
   an acquisition process in the number of processes, the acquisition process configured to change a first configuration of the sensor network to a second configuration of the sensor network in response to receiving configuration information;
   a number of avionics systems; and
   a processor unit configured to run the program code for the number of processes to receive raw information from the sensor network and the number of avionics systems during a test performed during operation of the aircraft, place the raw information in the random access memory, process the raw information to form processed information in real time while new raw information is being received in the random access memory in which the raw information and the processed information are both present in the random access memory, send the raw information to a storage system, send the processed information to the storage system, and determine whether a number of additional tests are needed using the processed information.

18. The test system of claim 17, wherein the sensor network is configured to change from the first configuration to the second configuration perform a different test during the operation of the aircraft.

19. The test system of claim 17, wherein the processor unit further runs the program code to initiate the number of additional tests during the operation of the aircraft in response to a determination that the number of additional tests is needed.

20. A method for processing information in real time, the method comprising:
receiving raw information from a sensor network and a number of systems in an aircraft, wherein the raw information is received during a test of the aircraft performed during operation of the aircraft;
placing the raw information in a memory;
processing the raw information using a number of processes run by a processor unit on the aircraft that accesses the memory to form processed information in real time while new raw information is being received in the memory in which the raw information and the processed information are both present in the memory;
storing the raw information in a storage system;
storing the processed information in the storage system;
determining whether a number of additional tests are needed for the aircraft using the processed information prior to a conclusion of the operation of the aircraft;
in response to receiving configuration information from an acquisition process, sending configuration information to the sensor network, wherein the sensor network is configured to change from a first configuration to a second configuration in response to receiving the configuration information to perform a different test; and
sending at least one of the raw information and the processed information to a remote location using a wireless communications link.

21. The method of claim 20 further comprising:
initiating the number of additional tests during the operation of the aircraft.

22. The method of claim 20, wherein the receiving step comprises:
receiving the raw information; and
associating metadata with each piece of the raw information.

23. The method of claim 20, wherein the sensor network is configured to change from the first configuration to the second configuration in response to receiving the configuration information to perform the different test during operation of the aircraft.

24. The method of claim 20 further comprising:
receiving simulation information;
placing the simulation information in the memory;
processing, by the number of processes, the simulation information placed into the memory to form processed simulation information.

25. The method of claim 24 further comprising:
comparing the processed information to the processed simulation information.

* * * * *